US007258652B2

(12) United States Patent
Florio et al.

(10) Patent No.: US 7,258,652 B2
(45) Date of Patent: Aug. 21, 2007

(54) ADJUSTABLE LEG FOR STILTS

(75) Inventors: Timothy J. Florio, Huntington Beach, CA (US); Elvin R. Jensen, Pasadena, CA (US)

(73) Assignee: Wallboard Tool Company, Long Beach, CA (US)

( * ) Notice: Subject to any disclaimer, the term of this patent is extended or adjusted under 35 U.S.C. 154(b) by 492 days.

(21) Appl. No.: 10/763,547

(22) Filed: Jan. 23, 2004

(65) Prior Publication Data
US 2005/0161288 A1 Jul. 28, 2005

(51) Int. Cl.
*A63B 21/00* (2006.01)
(52) U.S. Cl. .............................. 482/75; 482/76; 135/65
(58) Field of Classification Search .................. 482/76, 482/908, 75, 77; 623/28, 27; 135/65
See application file for complete search history.

(56) References Cited

U.S. PATENT DOCUMENTS

| 2,690,144 | A |   | 9/1954  | Ellis et al. |         |
|-----------|---|---|---------|--------------|---------|
| 2,747,300 | A |   | 5/1956  | Field        |         |
| 3,346,882 | A | * | 10/1967 | Wilhoyte     | 623/28  |
| 3,545,799 | A |   | 12/1970 | Gertsfeld    |         |
| 3,595,339 | A |   | 7/1971  | Ballard      |         |
| 3,596,952 | A |   | 8/1971  | Hinkle       |         |
| 4,569,516 | A |   | 2/1986  | Masterson    |         |
| 4,669,576 | A |   | 6/1987  | Jones et al. |         |
| 4,671,383 | A |   | 6/1987  | Huang        |         |
| 4,927,137 | A | * | 5/1990  | Speer        | 482/76  |
| 5,170,552 | A |   | 12/1992 | Swiderski et al. |     |
| 5,305,851 | A |   | 4/1994  | Katson et al. |        |
| 5,307,900 | A |   | 5/1994  | Noga         |         |
| 5,570,968 | A |   | 11/1996 | Sassmannshausen et al. | |
| 5,775,352 | A |   | 7/1998  | Obitts       |         |
| 5,857,650 | A |   | 1/1999  | Lin          |         |
| 5,908,085 | A |   | 6/1999  | Lovelady     |         |
| 5,913,382 | A |   | 6/1999  | Martin       |         |
| 5,975,592 | A |   | 11/1999 | Lin          |         |
| 6,032,914 | A |   | 3/2000  | Bastida      |         |
| 6,047,999 | A |   | 4/2000  | Dixon, Jr.   |         |
| 6,073,726 | A |   | 6/2000  | McCrystal    |         |
| 6,347,777 | B1 |  | 2/2002  | Webber et al. |        |
| 6,517,586 | B2 | * | 2/2003 | Lin          | 623/28  |
| 6,598,841 | B2 |  | 7/2003  | Erickson et al. |      |
| 6,918,564 | B2 | * | 7/2005 | Yen et al.   | 248/404 |

* cited by examiner

Primary Examiner—Jerome Donnelly

(57) ABSTRACT

A quick action lock for vertically adjustable legs of a stilt or workbench utilized by construction workers, as for example, installers of wallboard. The lock includes a pair of horizontally aligned squeeze spring fingers completely positioned within the confines of the telescoping struts of the legs for biasing a pair of stop pegs outwardly into alignable holes formed in such struts.

2 Claims, 4 Drawing Sheets

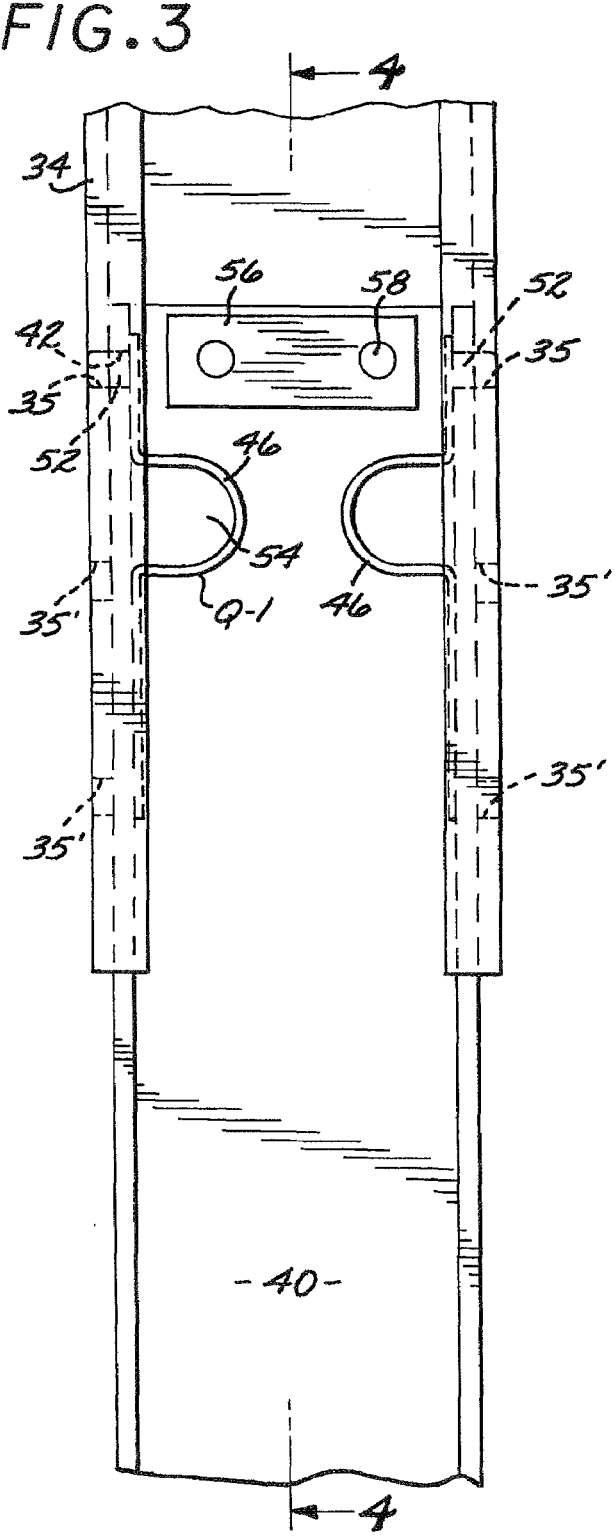
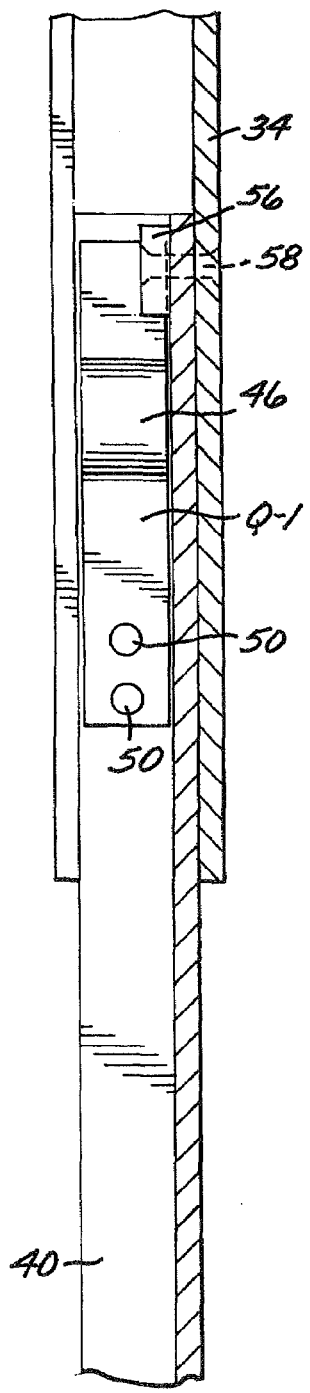

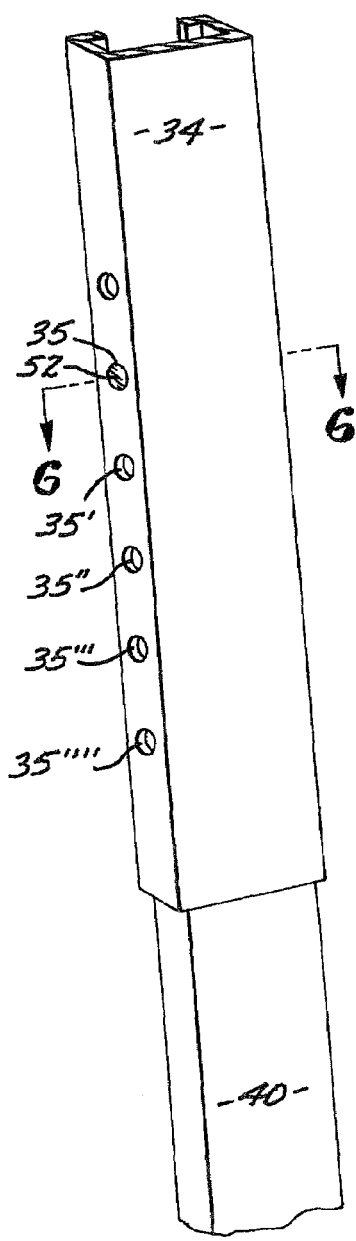
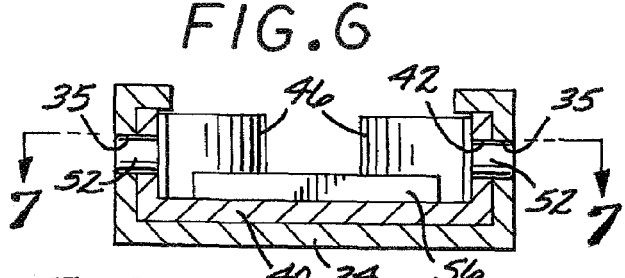
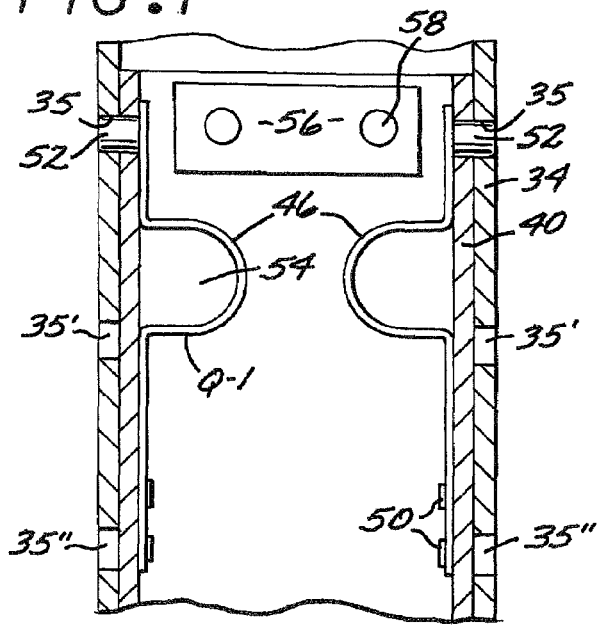
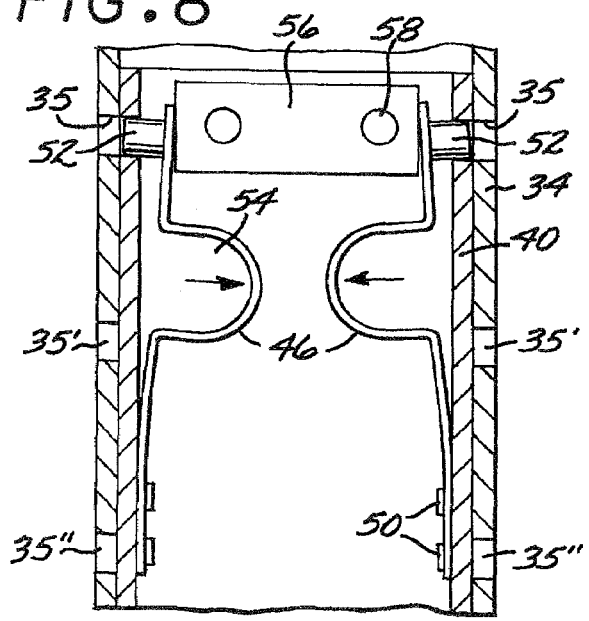

ADJUSTABLE LEG FOR STILTS

BACKGROUND OF THE INVENTION

Field of the Invention

Adjustable stilts that are strapped onto a workman's shoes to provide him with the necessary elevation to perform various tasks above the floor level have been in use several years. By way of example, the stilts are utilized during the installation of wallboards. The stilts include a pair of rigidly connected vertically adjustable legs defined by upper and lower channel-shaped struts. The bottom of each lower strut is attached to a rubber footpad. The upper ends of the upper struts are strapped to a workman's foot and leg. With heretofore proposed arrangements, a quick-action lock is provided between the upper and lower struts to control the effective height of such struts. The lock includes a plurality of vertically spaced, horizontally aligned holes formed in the struts. These holes selectively receive a pair of stop pegs. The stop pegs are slideably supported within a tube. The tube carries a pair of actuators which extend through slots in the tube to the stop pegs. A compression spring is interposed between the pegs within the tube to constantly bias the pegs outwardly. Each actuator is provided with a finger grip, with the grips being manually urged together to retract the pegs from within the adjustment holes to permit relative vertical sliding movement of the struts to thereby adjust the height of the stilt. Such locking arrangements have proven to be far from satisfactory. The parts of the lock tend to bind, particularly because of their exposure to foreign material, such as dust, present at construction jobs. Because of such tendency to bind, the stop pegs do not always securely lodge themselves within the adjustment holes. This leads to the danger that the lock will suddenly become inoperative causing the workman to risk a dangerous fall. The aforementioned binding tendency also requires considerable squeezing force to retract the stop pegs from within the adjustment holes.

An improvement over the quick action lock described above is disclosed in U.S. Pat. No. 4,569,516. Such improved quick adjustment lock employs a single integral curved generally wishbone-configured squeeze spring that carries a pair of stop pegs and normally firmly maintains such pegs within aligned adjustment holes of the upper and lower struts. The mid-portion of the curved spring extends outwardly of the struts to be engaged by the thumb and forefinger of a user to effect manual squeezing of the manual spring with resulting temporary retraction of the stop pegs from the adjustment hole. Because the free ends of the spring float relative to one another, it is difficult to simultaneously align both of the stop pegs from their respective adjustment holes. Accordingly, it can be time-consuming to rock the spring back and forth until the stop pegs both snap into their aligned respective adjustment holes.

Another disadvantage of the quick adjustment lock of U.S. Pat. No. 4,569,516 is that the wishbone-configured squeeze spring extends outwardly of the strut and can be damaged during stacking and transportation of the stilts with other equipment carried by the user. Adjustable spring locks of the type shown in U.S. Pat. No. 4,569,516 have also been utilized to adjust the length of inner and outer struts supporting a work bench. Again, it is difficult to simultaneously position both of the stop pegs with their respective alignment holes. Also, the squeeze spring is subject to damage during transportation of a work bench. Moreover, it can be difficult to access these springs to retract the stop pegs from the peg holes at certain heights of the work bench.

INVENTION SUMMARY

It is a major object of the present invention to provide a vertically adjustable lock for stilts, work benches and the like which eliminates the disadvantages of heretofore proposed locking devices of this type.

Another object of the present invention is to provide a vertically adjustable lock of the aforedescribed nature utilizing a squeeze spring which is completely confined between the sidewalls of the upper and lower struts.

A more particular object of the present invention is to provide a lock for a vertically adjustable leg having a pair of spring fingers which are more readily operable to simultaneously snap the adjustment pegs into their respective adjustment holes than the single wishbone-configured squeeze spring employed in locks of the types shown in U.S. Pat. No. 4,569,516 in addition to being more accessible than the wishbone-configured squeeze spring shown in such patent.

Other objects and advantages of the present invention will become apparent from the following detailed description when taken with the appended drawings.

BRIEF DESCRIPTION OF THE DRAWINGS

FIG. 3 is a broken side view of a quick-action lock embodying the present invention installed on a vertically adjustable leg of either the stilt of FIG. 1 or the workbench of FIG. 2, taken along lines 3-3 of FIG. 1 and FIG. 2;

FIG. 4 is a broken sectional view taken along line 4-4 of FIG. 3;

FIG. 5 is a broken exterior view of a vertically adjustable leg provided with a quick-action lock embodying the present invention;

FIG. 6 is a horizontal sectional view taken along line 6-6 of FIG. 5;

FIG. 7 is a vertical sectional view taken along line 7-7 of FIG. 6, showing a quick-action lock embodying the present invention securing the upper and lower struts of a vertically adjustable leg at a desired elevation; and FIG. 8 is a view similar to FIG. 7 showing a quick-action lock embodying the present invention with the parts thereof arranged in an unlocked position.

DETAILED DESCRIPTION OF THE PREFERRED EMBODIMENTS

Figure 1:
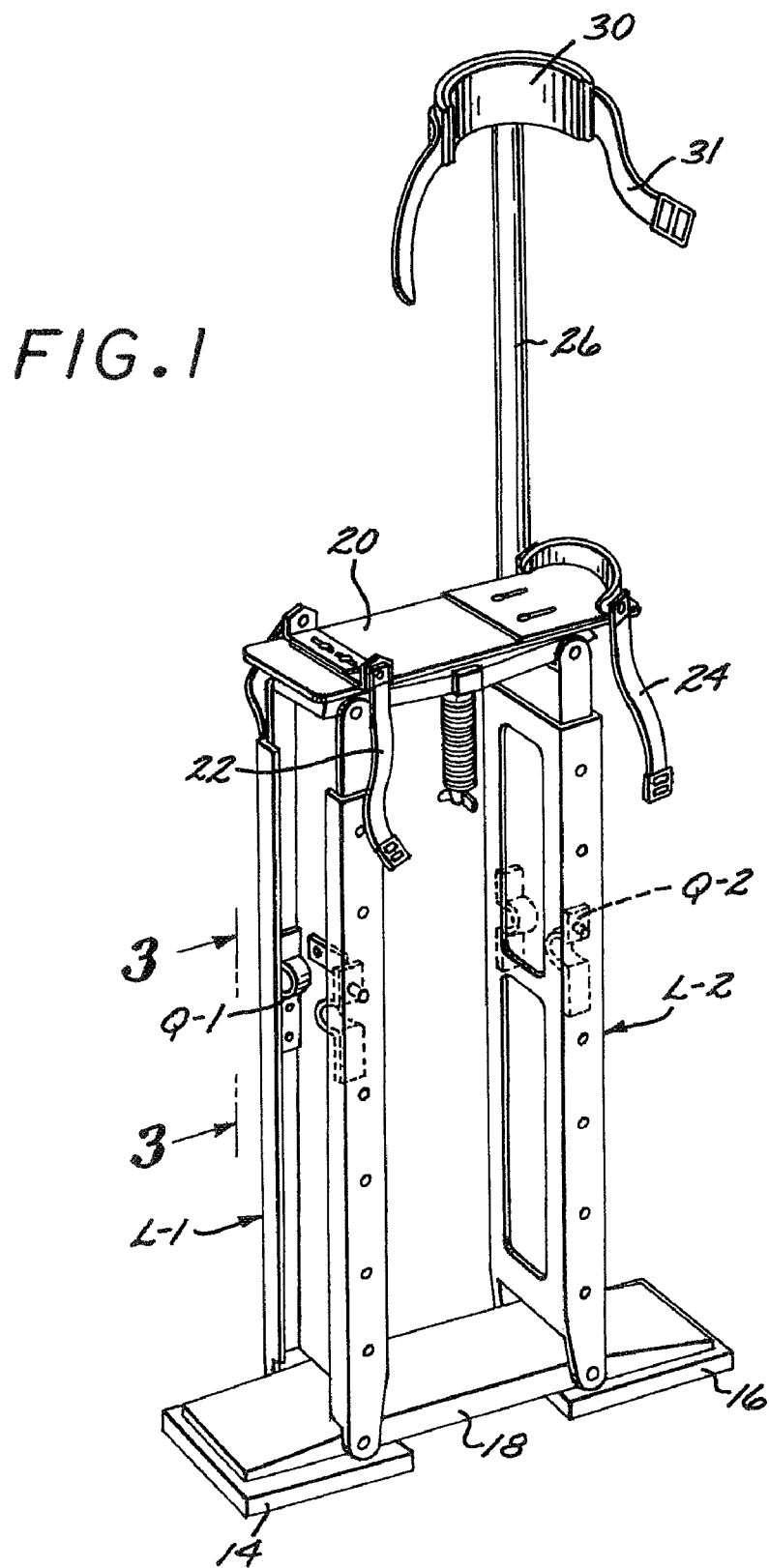
FIG. 1 is a perspective view showing a stilt utilizing a pair of vertically adjustable legs provided with a quick-action lock embodying the present invention.

Referring to the drawings and particularly FIG. 1 thereof, there is shown a stilt provided with a pair of vertically adjustable legs embodying the present invention. The stilt includes a front leg L-1 and a rear leg L-2 that are relatively vertically adjustable to control the height of the stilt. The legs are of generally similar construction and are mirror images of one another. The lower portion of each leg is provided with rubber foot-pads 14 and 16, respectively. The lower ends of such legs are rigidly connected by a crosspiece 18. The upper ends of legs L-1 and L-2 are rigidly connected by a foot support 20. foot support 20 is provided with a toe strap 22 and a heel strap 24. A generally vertically extending bar 26 is rigidly secured to the rear leg L-2 and extends upwardly above foot support 20 to be engagable with a workman's leg (not shown) by means of a leg pad 30 and a leg strap 31. Identical quick-action locks Q-1 and Q-2 are interposed between the upper and lower leg portions in a manner described in detail herebelow. Solely the quick-action lock Q-1 of the front leg L-1 is visible in FIG. 1. It should be understood that the aforementioned legs L-1 and L-2, cross-piece 18, foot support 20, toe strap 22, heel strap 24, leg bar 24, leg pad 30, and leg strap 31 are of conventional construction.

More particularly, and referring additionally to FIGS. 3 through 5, front leg L-1 includes an upper, outer channel-shaped strut, generally designated 34, which is open at its top and bottom extremities. A plurality of vertically spaced, horizontally aligned adjustment holes 35, 35', etc. are formed in the side walls 36 and 37 of upper strut 34. The side walls are integral with back wall 38. A lower, inner channel-shaped strut, generally designated 40, is vertically slideably disposed within upper strut 34. A pair of horizontally aligned peg holes 42 are formed in the upper portion of side walls 36 and 37 of lower strut 40. Side walls 36 and 37 are integral with back wall 46. The upper and lower ends of lower strut 40 are open. The dimensions of the upper and lower struts are so chosen that the struts can readily undergo relative vertical sliding movement with a minimum amount of wobbling.

Quick-action lock Q-1 is interposed between the upper and lower struts 34 and 40 to selectively lock the lower strut to the upper strut at different vertical elevations and thereby adjust the effective vertical height of the leg L-1. Lock Q-1 includes a pair of like horizontally aligned vertically extending squeeze spring fingers 46 secured at their lower ends to the inside of the inner struts, as by rivets 50. Each spring finger has a sidewardly extending stop peg 52 secured at its upper end to its spring finger for movement into the peg holes 42 for selective engagement with a desired pair of adjustment holes 35, 35', etc. The intermediate portion of each spring finger 46 is formed with a finger hold 54 engageable by the thumb and forefinger (not shown) of a user to effect manual squeezing of the spring fingers towards one another. In this manner, the stop pegs 52 can be withdrawn from their locking position extending between the peg holes 42 and adjustment holes 35 to selectively lock the upper and lower struts against relative vertical movement. With parts of the lock Q-1 disposed in their unlocked position of FIG. 8, the lower strut is movable vertically with respect to the upper strut until the stop pegs 52 are horizontally aligned with another desired pair of adjustment holes. Thereafter, the user releases his thumb and forefinger from the finger holds 54 and the spring fingers 46 will simultaneously snap the stop pegs outwardly within the selected pair of aligned adjustment holes 35, 35", etc. It is important to note that since the lower ends of the spring fingers are firmly locked to their respective inner struts 40 by rivets 50, inward squeezing movement by a user will automatically effect simultaneous retraction of stop pegs 52 from the adjustment holes 35, 35', etc. of the outer struts 34, as indicated in FIG. 8.

Preferably, the lock Q-1 further includes a stop plate 56 secured to the lower strut 40 between the upper ends of the spring fingers 46 to limit inward movement of the stop pegs 52 out of the confines of the peg holes 42. Rivets 58 may be extended between the stop plate and the lower strut to secure the stop plate to such lower strut. It should be understood that the spring fingers 46 normally bias the stop pegs 52 outwardly towards and into one of the adjustment holes 35, i.e. into a lock position.

The aforedescribed arrangement provides a locking system which is fast and easy to operate, will not bind under normal conditions and provides a firm interconnection of the upper and lower struts. Moreover, since the spring fingers are positioned within the confines of the struts, such spring fingers will be protected against damage during transportation of the stilts to and from a workplace. It should also be understood that the leg L-2 of the stilt of FIG. 1 will be adjusted as to its length in the same manner as described for the adjustment of the length of the front leg L-1. Once the stop pegs 52 are engaged with the adjustment holes 35 the pegs will firmly lock the upper and lower struts together.

Figure 2:
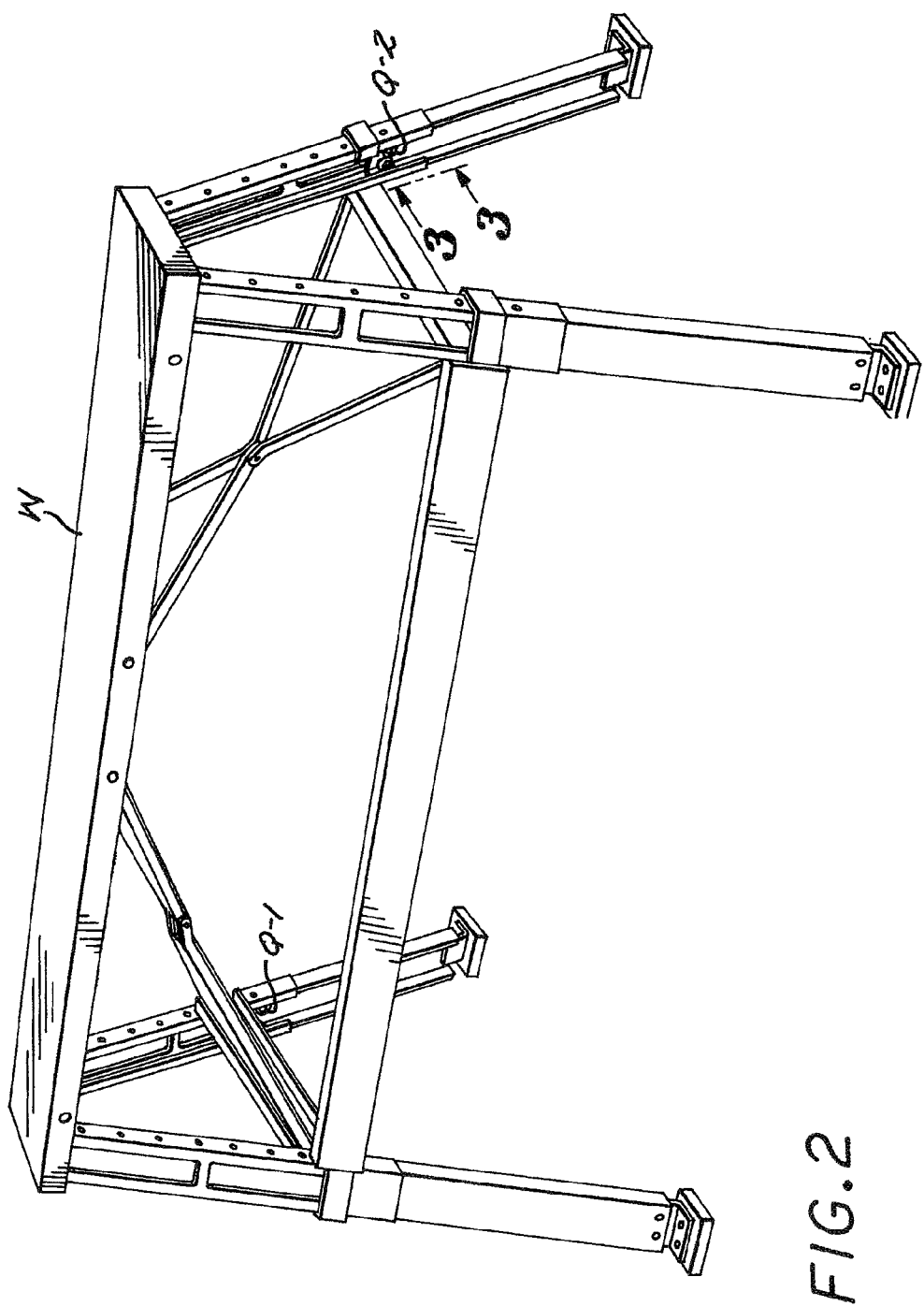
FIG. 2 is a perspective view of a workbench utilizing vertically adjustable legs having a quick-action lock embodying the present invention.

The construction and operation of the quick adjustment locks Q-1 and Q-2 described hereinabove and shown in FIGS. 3-8 are identical when such locks are applied to the four legs of the workbench W shown in FIG. 2. Additionally, it has been found to be easier to access the finger holds 54 when the quick-action locks Q-1 and Q-2 are applied to the legs of a workbench for a user of a lock Q-1 or Q-2 than to access the mid-portion of the squeeze spring of the lock disclosed in U.S. Pat. No. 4,569,516. The retractability of the adjustable legs permit easy storage or the workbench W such as within a car trunk. Additionally, the height of the workbench can be readily adjusted to conform to various working conditions.

Various modifications and changes may be made with respect to the foregoing detailed description without departing from the spirit of the present invention.

We claim:
1. A vertically adjustable and locking leg comprising:
  an upper channel-shaped strut, the side walls of which are formed with a plurality of vertically spaced, horizontally aligned adjustment holes, such side walls defining a front-facing opening;
  a lower channel-shaped strut vertically slidably disposed within the upper strut, the side walls of the lower strut being formed with a pair of horizontally aligned peg holes, and such side walls terminating on either side of the front-facing opening; and
  a quick action lock interposed between the upper and lower struts, such lock having a pair of like, vertically extending, horizontally aligned squeeze spring fingers secured to the inside of the inner strut, each squeeze spring finger having a sidewardly extending stop peg secured to its upper end and biased sidewardly by the spring fingers into the peg holes for selective engagement with a desired pair of adjustment holes to thereby adjust the combined length of the upper and lower struts, the spring fingers being positioned within the confines of the struts, and the intermediate position of each of the spring fingers being formed with a finger-hold engageable by the thumb and forefinger of a user to effect manual squeezing of the spring fingers towards one another effecting simultaneous temporary retraction of the stop pegs from the adjustment holes.

2. A vertically adjustable leg as set forth in claim 1 which further includes a stop plate secured to the lower strut between the upper ends of the spring fingers to limit inward movement of the stop pegs out of the confines of the peg holes.

* * * * *